(12) United States Patent
Badger et al.

(10) Patent No.: US 8,201,638 B1
(45) Date of Patent: Jun. 19, 2012

(54) AGRICULTURAL IMPLEMENT

(76) Inventors: Carl Badger, Wooster, OH (US);
Kimberly A. Lang, Wooster, OH (US)

( * ) Notice: Subject to any disclaimer, the term of this patent is extended or adjusted under 35 U.S.C. 154(b) by 0 days.

(21) Appl. No.: 13/099,134

(22) Filed: May 2, 2011

(51) Int. Cl.
*A01B 9/00* (2006.01)

(52) U.S. Cl. .......... 172/145; 172/48; 172/125; 172/219; 172/230

(58) Field of Classification Search .......... 172/39, 172/45, 46, 48, 51, 52, 68, 118, 122, 123, 172/125, 133, 138, 145, 151, 170, 172, 176, 172/177, 225, 229, 230, 240, 244, 452, 520, 172/521, 530, 541, 554, 202, 204, 218, 219
See application file for complete search history.

(56) References Cited

U.S. PATENT DOCUMENTS

| 3,508,617 | A | * | 4/1970 | Paynter | 172/68 |
| 3,539,015 | A | * | 11/1970 | Schlabs | 172/202 |
| 3,625,167 | A | * | 12/1971 | Van Der Lely | 111/186 |
| 3,633,679 | A | * | 1/1972 | Dahlberg et al. | 172/123 |
| 3,705,628 | A | * | 12/1972 | King | 172/68 |
| 3,876,013 | A | * | 4/1975 | Dunn | 172/71 |
| 3,998,276 | A | * | 12/1976 | MacMillan | 172/67 |
| 4,034,687 | A | * | 7/1977 | van der Lely | 111/133 |
| 4,048,929 | A | * | 9/1977 | Zumbahlen | 111/146 |
| 4,051,902 | A | * | 10/1977 | van der Lely | 172/32 |
| 4,055,126 | A | * | 10/1977 | Brown et al. | 111/148 |
| 4,211,175 | A | * | 7/1980 | van der Lely | 111/127 |
| 4,213,408 | A | * | 7/1980 | West et al. | 111/194 |
| 4,258,635 | A | * | 3/1981 | Lutz et al. | 111/52 |
| 4,287,710 | A | * | 9/1981 | van der Lely | 56/372 |
| 4,552,079 | A | * | 11/1985 | Werner | 111/161 |
| 4,762,182 | A | * | 8/1988 | Reimann | 172/327 |
| 5,062,488 | A | * | 11/1991 | Lochmiller | 172/1 |
| 5,353,881 | A | * | 10/1994 | Lee et al. | 172/52 |
| 5,524,711 | A | * | 6/1996 | Harris | 172/67 |
| 5,590,722 | A | * | 1/1997 | Torgrimsen | 172/219 |
| 5,740,868 | A | * | 4/1998 | Stangeland | 172/219 |
| 6,494,270 | B1 | * | 12/2002 | Lawson | 172/554 |
| 2002/0079110 | A1 | * | 6/2002 | Pellenc et al. | 172/439 |
| 2010/0314141 | A1 | * | 12/2010 | Merkt | 172/4.5 |

* cited by examiner

*Primary Examiner* — Robert Pezzuto
*Assistant Examiner* — Jamie L McGowan
(74) *Attorney, Agent, or Firm* — Christopher L. Parmelee; Walker & Jocke

(57) ABSTRACT

An agricultural implement in the form of a dicing plow booster device is provided that is operative to connect to a further hitch device of a front end of a plow. The implement has a dicing drum in rotating connection with a dicing drum frame, and has a drive roller in rotating connection with the drive roller frame. The dicing drum comprises a plurality of blades. A first hydraulic motor causes the dicing drum to rotate in a first direction. A second hydraulic motor causes the drive roller to rotate in a second direction opposite the first direction. When the agricultural implement is mounted to the plow, the dicing drum and drive roller are positioned rearwardly of the plow. The drive roller rotating in the second direction is operative to urge the agricultural implement to move in a direction towards the plow.

17 Claims, 11 Drawing Sheets

AGRICULTURAL IMPLEMENT

BACKGROUND

A plow is a device that is typically used to cut, lift, and turn over soil in an agricultural field. However, some types of plows such as a moldboard plow may place the field in a condition that releases an excessive amount of carbon dioxide into the atmosphere compared to no-till farming practices. However, no-till farming practices may have environmental disadvantages as well. For example, by not plowing the field, there is an increase in risk that fertilizer run off may pollute lakes and cause excessive algae growth. Thus, there exists a need for an improved apparatus and method for use with plowing.

SUMMARY

The following is a brief summary of subject matter that is described in greater detail herein. This summary is not intended to be limiting as to the scope of the claims.

In an example embodiment, the process of plowing may be made more environmentally friendly by mounting an agricultural implement in the form of a dicing plow booster device behind the plow. Such an implement may include a rotating dicing drum which is operative to carry out secondary tillage of soil that has been initially tilled by the plow it follows. Such a dicing plow booster device may also be adapted to pull additional implements such as a seeder. As a result, a tractor may be operative to carry out primary tillage, secondary tillage, and seeding in one pass (rather than three passes with different implements). As a result, the amount of exhaust gases and carbon dioxide produced by the tractor may be reduced.

In an example embodiment, the dicing drum may rotate in a first direction that is opposite to the direction the wheels of the tractor roll when moving in a forward direction. To reduce and/or eliminate the additional drag that such an implement would add to the tractor pulling the plow, an example embodiment of the implement may include a drive roller that is operative to rotate in a second direction (opposite the first direction) to at least partially urge the implement forward in a direction of the plow to which it is attached. Such a drive roller may include radial extending projections which enhance traction with the ground. Also the longitudinal lengths of the drive roller and the dicing drum may be substantially the same. As a result, the combined action of the dicing drum (which further breaks apart the soil) and the drive roller (which levels the soil) may serve to seal the soil surface, which may reduce carbon dioxide emissions compared to a field that is only plowed with a moldboard plow.

In this described example, the moldboard plow may include a front end that is mounted via a hitch device (e.g. ball and/or socket, pin coupling, etc.) to a tractor. In addition, the moldboard plow may include, or may be adapted to include a further hitch device mounted on the front of the plow to which the dicing plow booster device may be mounted.

To further assist in maintaining the dicing plow booster device in aligned relation behind the plow, the plow may include or may be adapted to include a locating control arm that extends rearward from the back end of the plow. Such a locating control arm may be adapted to connect to a portion of the dicing plow booster device. As a result, the dicing plow booster device is anchored to the plow at two different spaced-apart locations on the plow and two different spaced-apart locations on the dicing plow booster device. The anchoring of the dicing plow booster device in this manner, in combination with the rotation of the drive roller, is operative to resist sidedraft forces (which tend to urge the back of the plow away from the direction the plow is moving the soil).

In an example embodiment, the dicing plow booster device may include carrier wheels that are hydraulically operated to lift and lower the dicing drum and the drive roller. During use of the dicing plow booster device, the carrier wheels may move to a position that is spaced above the ground surface on which the drive roller and dicing drum are supported. To transport the dicing plow booster device, the carrier wheels may be hydraulically moved downwardly in a manner which places the carrier wheels on the ground surface and that urges the dicing drum and the drive roller upwardly to positions that are spaced above the ground surface.

In a further example embodiment, when the dicing plow booster device is being used to till soil, the dicing drum and drive roller may be operative to move in vertical directions relative to each other. Such vertical relative movement allows the dicing drum and drive roller to maximize contact with the soil by compensating for changes in the depth of the soil and the presence of rocks or other obstacles in the soil.

In addition, example embodiments of the dicing plow booster device may include an additional hitch device mounted to the back end of the dicing plow booster device. Such an additional hitch device may correspond to a three-point quick-coupler or other releasable connector to which additional agricultural implements may be connected in positions behind the dicing plow booster device. Examples of such additional agricultural implements may include (but are not limited to): a three-point hitch tine harrow; a three-point toolbar and unit planters; a three-point grass seeder; and a three-point grain drill with single or double press wheels.

Other aspects will be appreciated upon reading and understanding the attached figures and description.

DETAILED DESCRIPTION

Figure 1:
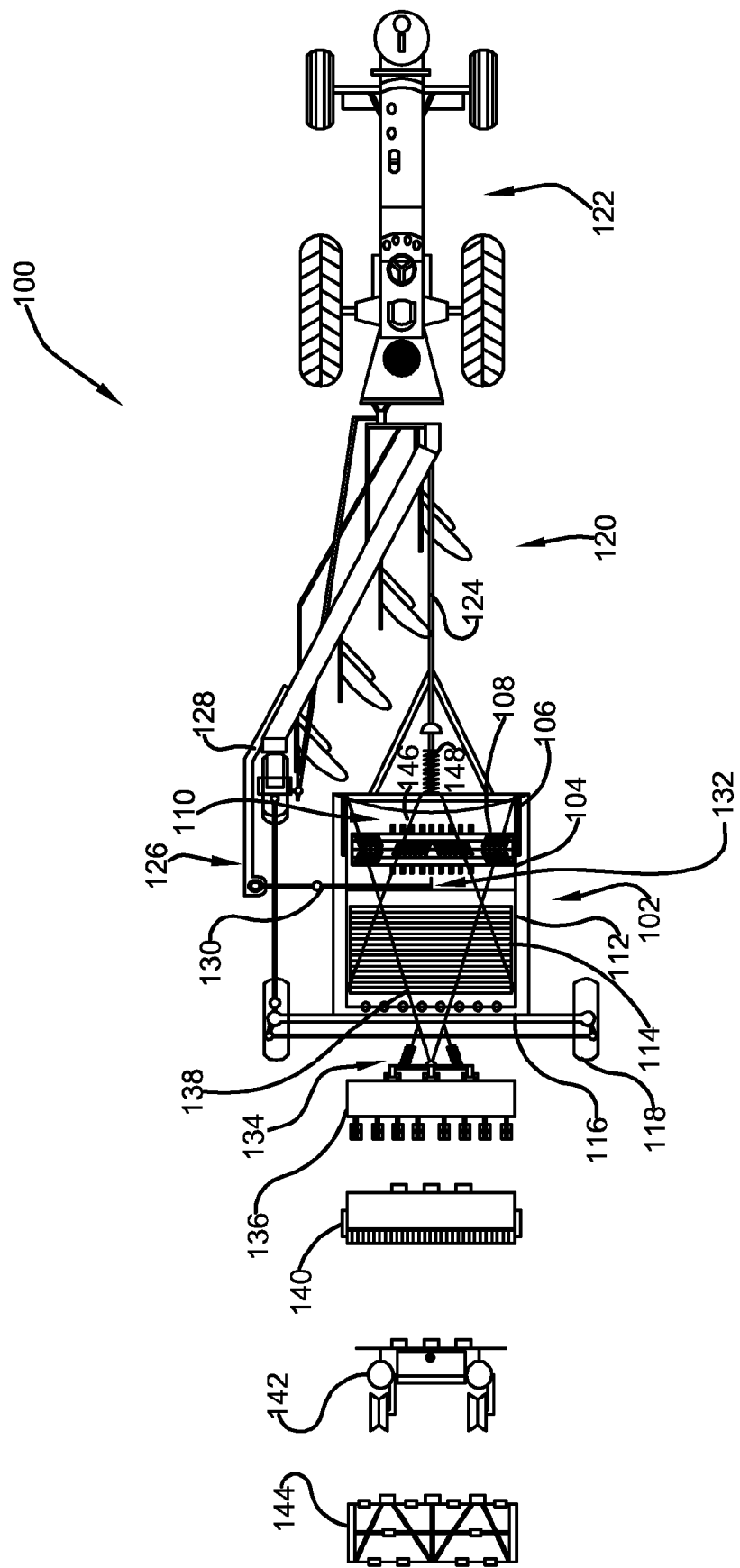
FIG. 1 shows a top view of an example embodiment of an agricultural apparatus that facilitates plowing and tilling soil.

Various technologies pertaining to an agricultural implement will now be described with reference to the drawings, where like reference numerals represent like elements throughout. In addition, it is to be understood that functionality that is described as being carried out by certain system components may be performed by multiple components. Similarly, for instance, a component may be configured to perform functionality that is described as being carried out by multiple components.

With reference to FIG. 1, a top view of an example agricultural apparatus 100 that facilitates plowing and tilling soil is illustrated. The apparatus 100 includes a dicing plow booster device 102 which is an agricultural implement that is adapted to mount behind a plow 120. The plow in turn may be adapted to be mounted behind a tractor 122. Such a plow, for example, may correspond to a moldboard type plow. However, it is to be understood that in other example embodiments, the described dicing plow booster device 102 may be mounted to other types of plows that are pulled behind a tractor.

In an example embodiment, the dicing plow booster device may include a first framework 104 comprising a dicing drum frame 106 and a dicing drum 108 in rotating connection with the dicing drum frame. As will be illustrated in more detail below, the dicing drum comprises a plurality of blades 110 that may extend in a radial direction from a surface of the dicing drum. In addition, the first framework 104 may also include a drive roller frame 112 and a drive roller 114 in rotating connection with the drive roller frame.

In this described example, the dicing plow booster device may include a second framework 116 that is in pivoting connection with the first framework 104. The second framework may include carrier wheels 118 that may be used to facilitate transportation of the implement.

Figure 2:
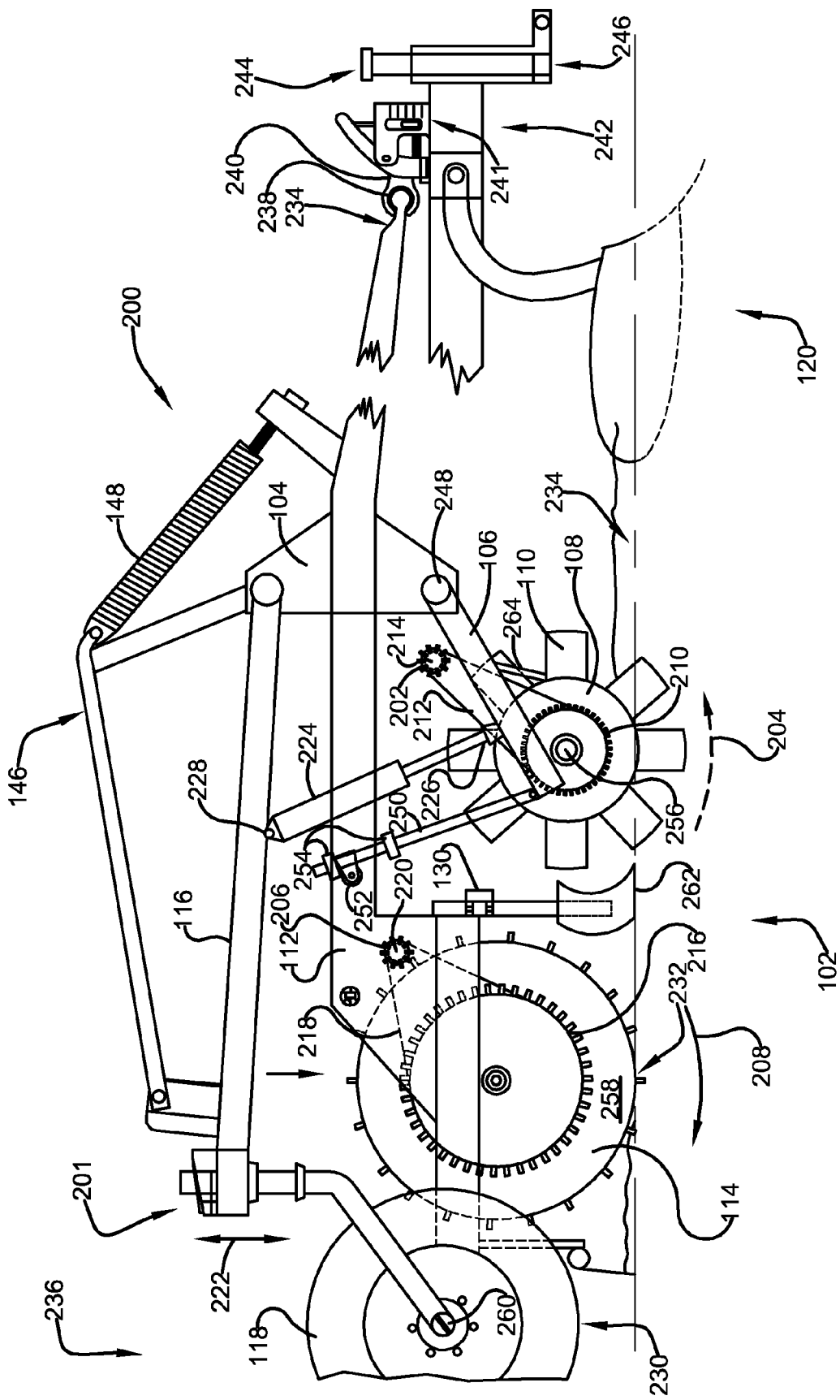
FIG. 2 shows a side view of an example embodiment of the apparatus.

FIG. 2 illustrates a side view 200 of this described apparatus. As shown in FIG. 2, the described carrier wheels 118 may correspond to rotatable caster wheels. Such castor wheels may include a locking mechanism 201 that can be selectively engaged to lock the castor wheels in place.

In an example embodiment, the dicing plow booster device 102 may include at least one first hydraulic motor 202 operatively configured to cause the dicing drum to rotate in a first direction 204. Also, the dicing plow booster device 102 may include at least one second hydraulic motor 206 operatively configured to cause the drive roller to rotate in a second direction 208 opposite the first direction.

In an example embodiment, two of the first hydraulic motors 202 may be mounted (on each side of the dicing drum frame) to facilitate rotating the dicing drum. In an example embodiment, such hydraulic motors may be directly mounted to the shaft of the dicing drum to directly drive the dicing drum.

Also, as shown in FIG. 2, in order to rotate the drive roller, the drive roller may include at least one drive roller sprocket 216 connected via at least one chain 218 to a motor sprocket 220 of the hydraulic motor 206. In addition, it should be appreciated that in some embodiments (such as shown in FIG. 2) the dicing drum may also be driven using a dicing drum sprocket 210 (connected via a chain 212 to a first motor sprocket 214 of the first hydraulic motor 202), rather than directly coupling the first hydraulic motor to the shaft of the dicing drum. However, it should be appreciated that such a dicing drum sprocket would be relatively close to the soil and thus may accumulate dirt thereon. Such dirt may increase the rate of wear of the sprocket 210 and/or chain 212. Embodiments that use two hydraulic motors directly coupled to the shaft of the dicing drum would avoid such issues.

In example embodiments, flange type bearings may be mounted to the shafts of the dicing drum and/or drive roller to facilitate rotation thereof around the rotational axes 256, 258. However, it should be appreciated that other example embodiments may use pillow block bearings or other types of bearings mounted to the shafts of the dicing drum and/or drive roller.

Figure 3:
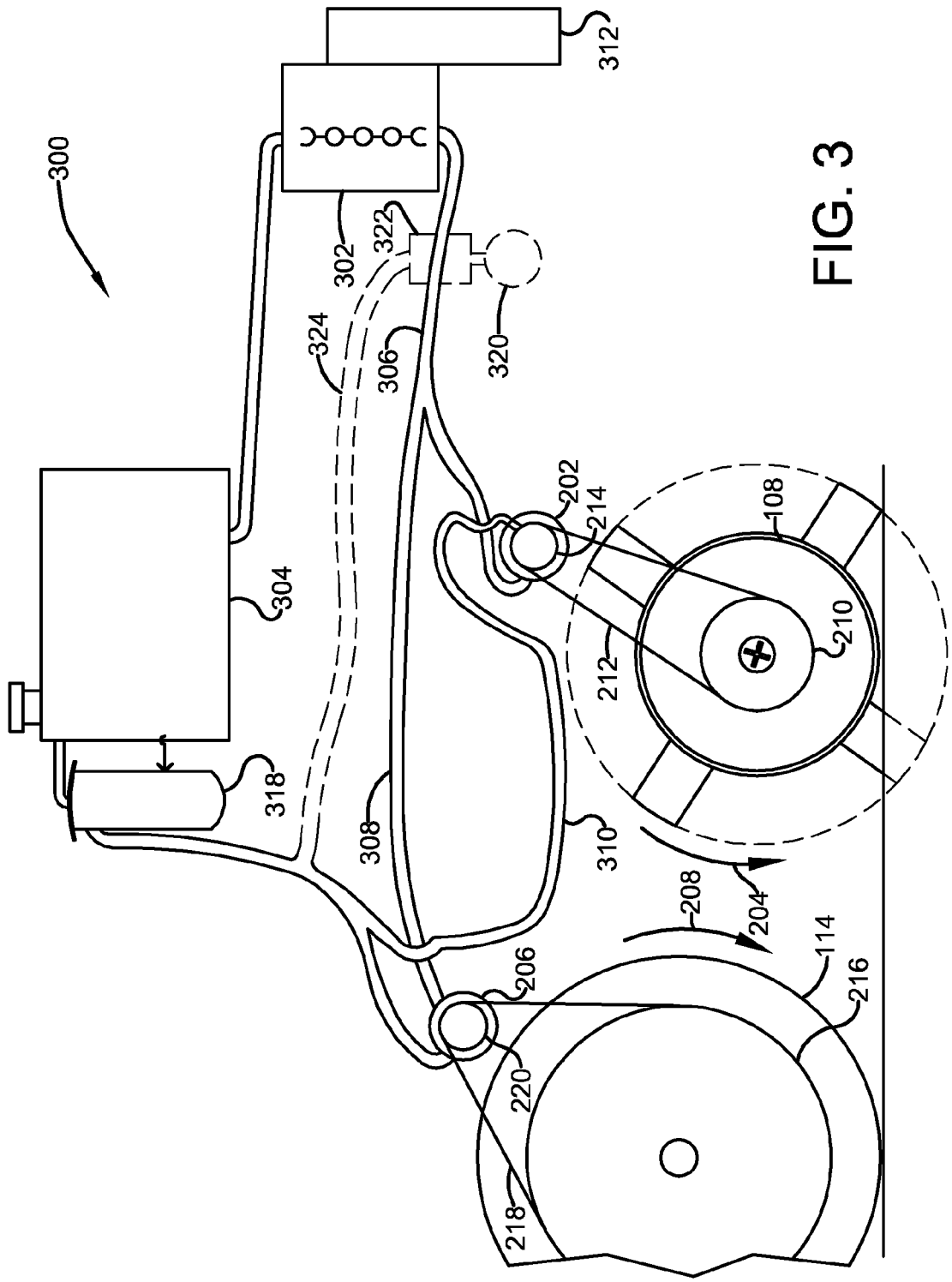
FIG. 3 shows a schematic view of an example embodiment of a hydraulic system.

FIG. 3 illustrates a schematic view of an example hydraulic system 300 that may be used by the described apparatus to operate the first and second hydraulic motors. In this example, the hydraulic system may include a hydraulic pump 302, a hydraulic fluid reservoir 304, and a hydraulic line 306 in fluid communication between the hydraulic pump and the hydraulic fluid reservoir. The hydraulic line may also include one or more filters 318 and different portions or segments that are connected to the hydraulic motors 202, 206. For example, the hydraulic line may include first and second line portions 308, 310 that extend in parallel between the hydraulic pump 302 and the hydraulic fluid reservoir 304. The first line portion 308 may be in operative connection with the at least one first hydraulic motor 202. Also, the second line portion 310 may be in operative connection with the at least one second hydraulic motor 206.

It should be appreciated that in example embodiments in which a hydraulic motor 202 directly drives the dicing drum shaft, a corresponding 1-1 ratio will be produced for the RPMs of the hydraulic motor 202 and dicing drum shaft. In contrast, the drive roller may be driven by sprockets configured to rotate the drive roller at RPMs that are substantially lower than the RPMs of the dicing drum.

In example embodiments that include a dicing drum sprocket 210, the dicing drum sprocket 210 may be smaller in diameter than the drive roller sprocket 216 (as shown in FIG. 3) in order to cause the driver roller to be rotated at RPMs that are substantially lower than the RPMs of the dicing drum. For example, a gearing ratio (i.e., relative sprocket circumference sizes, etc.) between the first motor sprocket 214 and the dicing drum sprocket 210 may be in a range of about 1-1 to about 1-3, whereas a gearing ratio between the second motor sprocket 220 and the drive roller sprocket 216 may be in the range of about 1-8 to about 1-10.

As illustrated in FIG. 3, the hydraulic pump 302 may be mounted to (and driven by) the PTO 312 of the tractor. An example hydraulic pump that may be used in the example system includes a Prince direct drive gear hydraulic pump. Also, in this described embodiment, the hydraulic motors 202, 206 may correspond to equal displacement orbit hydraulic motors. However, it should be understood that in alternative embodiments, other types of hydraulic motors and pumps may be used which are operative to operate and cause the dicing drum 108 and drive roller 114 to rotate. In addition, it should be understood that the side views of the apparatus and systems shown in FIGS. 2 and 3 illustrate only one set of hydraulic motors 202, 206, chains 212, 218, sprockets 210, 214, 216, 220, and hydraulic line portions 308, 310 on one side of the dicing plow booster device. However, it should be appreciated that example embodiments may have additional sets of the described hydraulic motors, chains, and sprockets, and hydraulic line portions that are located on the opposed sides of the dicing drum and drive roller.

In addition as shown in FIG. 3, the hydraulic system 300 may include a pressure gauge 320. Also, the hydraulic system 300 may include a flow valve 322 including a relieve valve to bleed off excess pressure through a return line 324. Further, it should be understood that in example embodiments, other types and arrangements of motors, pumps, chains, and/or hydraulic lines may be used to drive the dicing drum and drive roller. For example, in an alternative embodiment, rather than using the PTO to drive the pump 302, the described apparatus may include a second engine (different than the engine of the tractor) which is configured to operate the pump 302. Such an engine, for example, may include a diesel engine that is mounted to the tractor, plow, or the dicing plow booster device itself. Also, it should be appreciated that the scope of the described apparatus may also include the dicing drum and drive roller being driven by one or more mechanical shafts, transmissions, or other mechanical arrangements in place of or in addition to the hydraulically driven system previously described.

Referring back to FIG. 2, in order to facilitate transportation of the dicing plow booster device, the second framework 114 with the carrier wheels 118 is operative to move in vertical directions 222 relative to the first framework that includes the dicing drum frame 106 and the drive roller frame 112. In this described embodiment, the dicing plow booster device includes a hydraulic cylinder 224 on one or more sides of the first and second frameworks. Such a hydraulic cylinder includes a first end 226 in operative pivoting connection with the first framework 104 (such as the dicing frame) and a second opposed end 228 in operative pivoting connection with the second framework 114.

The hydraulic cylinder 224 is operative to move between an extended position (shown in FIG. 2) and a retracted position (not shown). When the hydraulic cylinder is in the extended position, the second framework 114 is in a position relative to the first framework 104 in which the a lowermost surface 230 of the carrier wheels 118 is located above a lowermost surface 232 of at least one of the drive roller 114 and the dicing drum 108. In this position, the dicing plow booster device is in an operative position to till the ground 234 and support the carrier wheels above the ground.

However, when the hydraulic cylinder 224 is in the retracted position, the first framework will move to a position relative to the second framework in which lowermost surfaces of both the drive roller and the dicing drum are located above the lowermost surface of the carrier wheels. As a result, the carrier wheels will be located on the ground 234, and are operative to support the drive roller and the dicing drum above the ground.

In FIG. 2, a hydraulic cylinder 224 is shown on one side of the dicing plow booster device. However, it should be appreciated that in this described embodiment and/or in alternative embodiments, a second hydraulic cylinder may be mounted in a corresponding manner on the opposite side of the implement. Also, it should be appreciated that the hydraulic cylinder 224 may be operated via the hydraulic system of the tractor and/or via a hydraulic line included in the described hydraulic system 300 shown in FIG. 3. One or more valves and/or other controls may be used to selectively control the hydraulic cylinders.

Referring back to FIG. 1, it should be appreciated that the dicing plow booster device is mounted to a plow in a manner that maintains the implement parallel and offset (in a direction the plow is moving the soil) with respect to the draft center line of the plow. As shown in FIG. 2, the dicing plow booster device includes a front end 234 and a back end 236, and a hitch device 238 adjacent the front end that is operative to connect to a corresponding hitch device 240 that is mounted to a front end 242 of the plow 120. The front portion of the plow also includes a hitch device 244 that is operative to connect to a corresponding hitch device 246 of the back end of the tractor. Also, in an example embodiment, the hitch device 240 of the plow may include a scale 241. Such a scale may include one or more movable members and springs that are operative to provide a visual indication of how much forward force the drive roller is imparting on the plow and the back of the tractor.

As shown in FIG. 1, the described dicing plow booster device 102 may include a tongue 124 that extends from the hitch of the plow to the first and second frameworks 104, 116. Such a tongue has a length sufficient to position the dicing drum 104, drive roller 114, and the carrier wheels 118 rearwardly of the plow 120. As a result, when the drive roller is rotating, it is operative to urge the entire dicing plow booster device to move in a direction towards the plow and the tractor.

Figure 12:
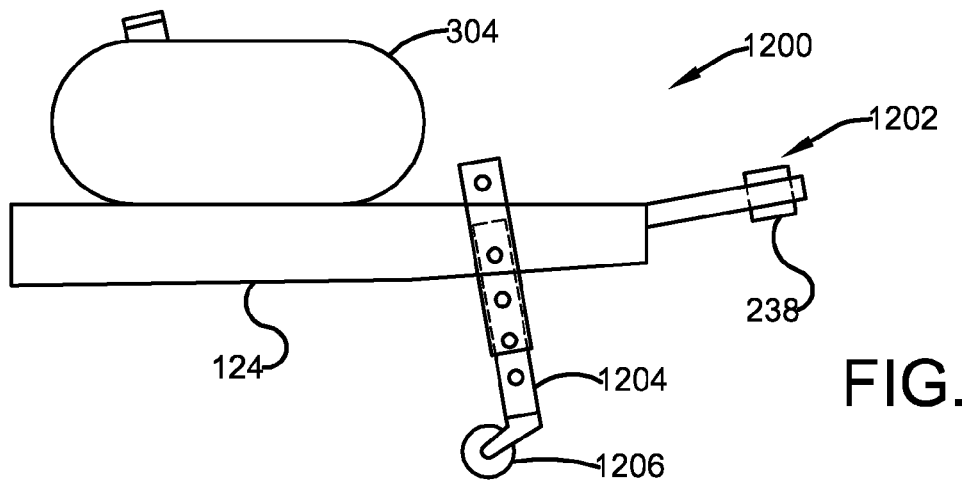
FIG. 12 shows a side view of an example embodiment of a tongue of the apparatus.

FIG. 12 illustrates a side view 1200 of the tongue 124. As shown in FIG. 12, the previously described hitch device 238 may correspond to a ball and socket type hitch device 1202 mounted to the tongue 124. Also, an example embodiment of the tongue may include a parking leg 1204 and caster 1206 which are operative to support the tongue when the implement is not mounted to a plow. In addition to provide balance and additional weight to the front of the implement (which prevents the tongue from pivoting upward when disconnected from the plow), the previously described hydraulic fluid reservoir 304 may be mounted on the tongue.

Referring back to FIG. 1, to keep the dicing plow booster device 102 in a desired alignment behind the plow (e.g., parallel and offset to the draft center line of the plow), the described implement may include a locating control arm 126 in pivoting connection with at least one of the first framework and the second framework. Such a locating control arm 126 may include a first portion 128 that is adapted to connect to and extend rearwardly from a back end of the plow 120. Such a locating control arm 126 may also include a second portion 130 that extends laterally from the first portion 128 and into operative connection with at least one of the first framework and the second framework. In an example embodiment, the first portion 128 and the second portion 130 may be in pivoting connection with each other. As shown in FIGS. 1 and 2, the second portion 130 of the control arm 126 may be connected to a central portion 132 of the drive frame 112 between the drive roller 114 and the dicing drum 108.

Figure 4:
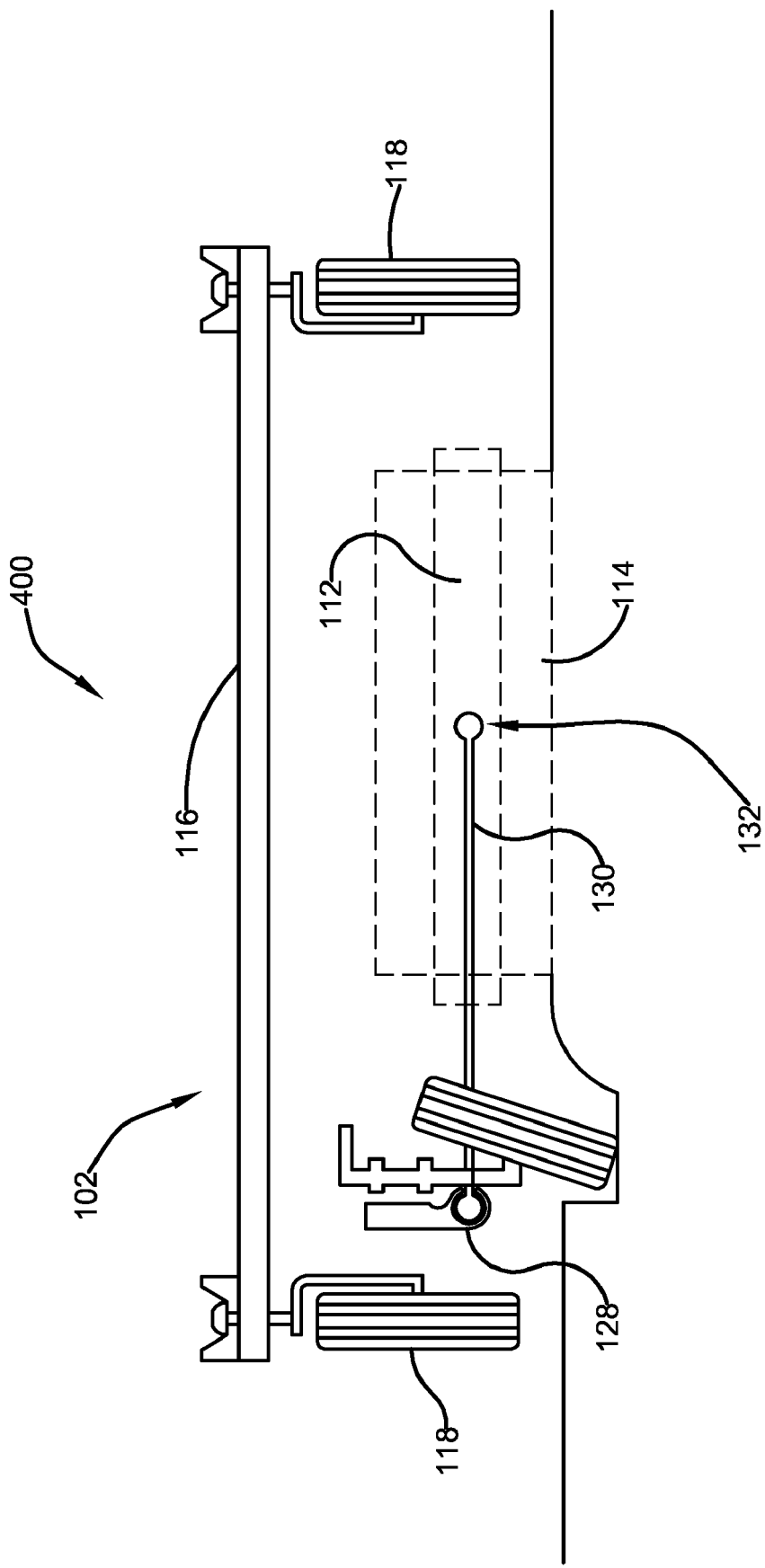
FIG. 4 shows a schematic rear view of an example embodiment of the apparatus.
Figure 11:
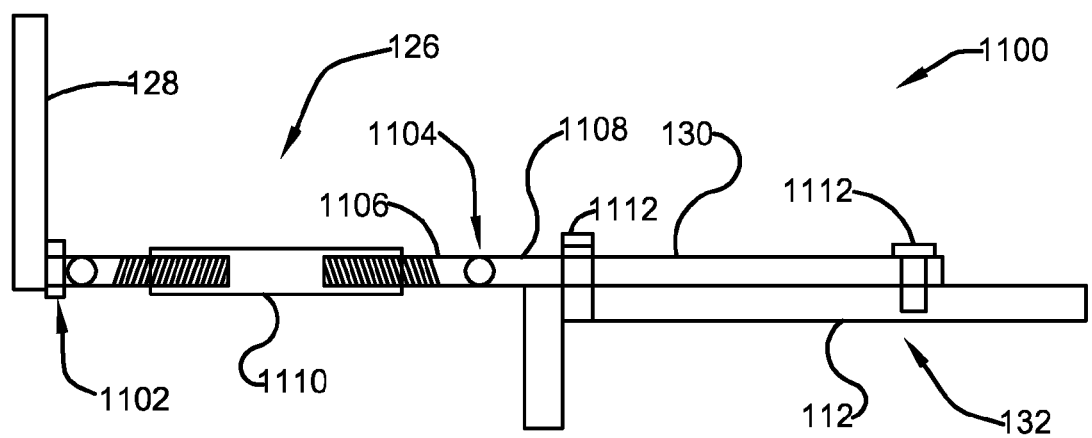
FIG. 11 shows a top view of an example embodiment of a control arm.

FIG. 4 illustrates a schematic back view 400 of this example embodiment of the dicing plow booster device 102 with the outline of the driver roller 114 and drive roller frame 112 shown in phantom. FIG. 11 illustrates a top view 1100 of the control arm 126 connected to the drive roller frame 112. As shown in FIG. 11, the control arm may include a u-joint 1102 or other pivot device that enables the first portion 128 of the control arm to pivot with respect to the second portion 130 of the control arm. Also as shown in FIG. 11, the control arm may include a vertical pivot pin 1104 or other pivot device that enables first and second segments 1106, 1108 of the second portion 130 to pivot in horizontal directions with respect to each other.

In this described example, one of the segments 1106 of the control arm may include a turnbuckle 1110 to provide lateral adjustment of the control arm. Also, the other one of the segments 1108 of the control arm may be fastened to the drive roller frame 112 via guide straps 112 or other fasteners.

Referring back to FIG. 1, in example embodiments, the described dicing plow booster device 102 may include an additional hitch device 134 that facilitates mounting at least one further agricultural implement 136 rearwardly of the dicing plow booster device. In this described embodiment, the additional hitch device 134 may correspond to a three-point quick-coupler held by centering springs including anchor trusses 138 (e.g., cables) which urge the further implement 136 to be centered behind the dicing plow booster device 102.

As shown in FIG. 1, the further agricultural implement 136 may correspond to a three-point grain drill with single or double press wheels. However, it is to be understood that the further implement 136 may correspond to other types of agricultural implements such as a three-point grass seeder 140, a three-point toolbar and unit planters 142, and a three-point hitch tine harrow 144.

Referring back to FIG. 2, an example embodiment of the dicing plow booster device 102 may be operatively configured to enable the drive roller 114 to move vertically relative to the dicing drum 108. Such vertical movement may allow maximized contact of the drive roller 114 and dicing drum 108 with irregular surface features and rocks on the ground 234. To enable such relative vertical movement, the dicing drum frame 106 may be in pivoting connection with the drive roller frame 112 at a pivot point 248.

However, in order to also enable both the dicing drum and the drive roller to move upwardly together above the ground (when the carrier wheels 118 are lowered), the described embodiment may include at least one linkage 250 that extends between the dicing drum frame 106 and the drive roller frame 112. In this example, the first end 226 of the at least one hydraulic cylinder 224 may be in operative connection with the dicing drum frame 106 (or the drive roller frame 112). Thus, when the at least one hydraulic cylinder 224 moves between the extended and retracted positions, the at least one linkage 250 is operative to cause both the dicing drum frame 106 and the drive roller frame 112 to move together relative the second framework 114 having the carrier wheels 118.

Also, in order to enable the dicing drum frame 106 and the drive roller to continue to be able to pivot and move relatively vertically with respect to each other, the linkage 250 may be operative to slide through a limited range of distances with respect to the drive roller frame (or the dicing drum frame). For example, as shown in FIG. 2, a fastener 252 in pivoting connection with the drive roller frame 112 may be operative to slide along the linkage 250 between first and second adjustable stops 254.

Also, it should be appreciated that alternative embodiments may use other arrangements of linkages and stops to provide limited vertical relative movement for the dicing drum and the drive roller. For example, FIGS. 5, 6, 14, and 15 show an example of an alternative embodiment 500 of the linkage which includes a central hand crank shaft 520 that is centrally located and is rotatable with a handle 522. In this embodiment, the drive roller frame may include a centrally located slotted frame bracket 502 (e.g., which is centrally located between the left and right sides of the drive roller frame 112). The frame bracket 502 may include spaced-apart slots 504 therein. In this example embodiment, the shaft 520 may include a first trunnion 506 having projections 508 that are operative to slide in the slots 504. In addition, the shaft 520 may include a second trunnion 510 that is in operative connection with further portions of the linkage such as a cross member portion 512 and first and second side linkage portions 514, 516. The first and second side linkage portions connect the cross member portion 512 to the dicing drum frame on each side of dicing drum.

In this example, the first trunnion 506 is operative to slide up and down in the slots 504 to provide the previously described relative vertical movement between the dicing drum and the drive roller. Also, to enable the vertical length of the linkage to be adjustable, the shaft 520 includes a lower threaded portion 524 that is in operative threaded connection with the second trunnion 510. When the shaft is rotated (via the handle 522) the shaft is operative to rotate with respect to the first and second trunnions, which causes the second trunnion to move up or down the threads of the shaft depending on the direction of rotation of the shaft. Thus rotation of the shaft is operative to change a distance between the first and second trunnions, which adjusts the relative vertical positions of the dicing drum and drive roller.

Also it should be appreciated that when the dicing drum frame moves upwardly in response to the at least one hydraulic cylinder moving from the extended position to the retracted position, the first trunnion 506 is operative to move relative to the slots 504 until the first portion of the trunnion reaches an end of the slots, wherein further upward movement of the dicing drum frame is operative to cause the first trunnion 506 to urge the drive roller frame upwardly off the ground.

Figure 5:
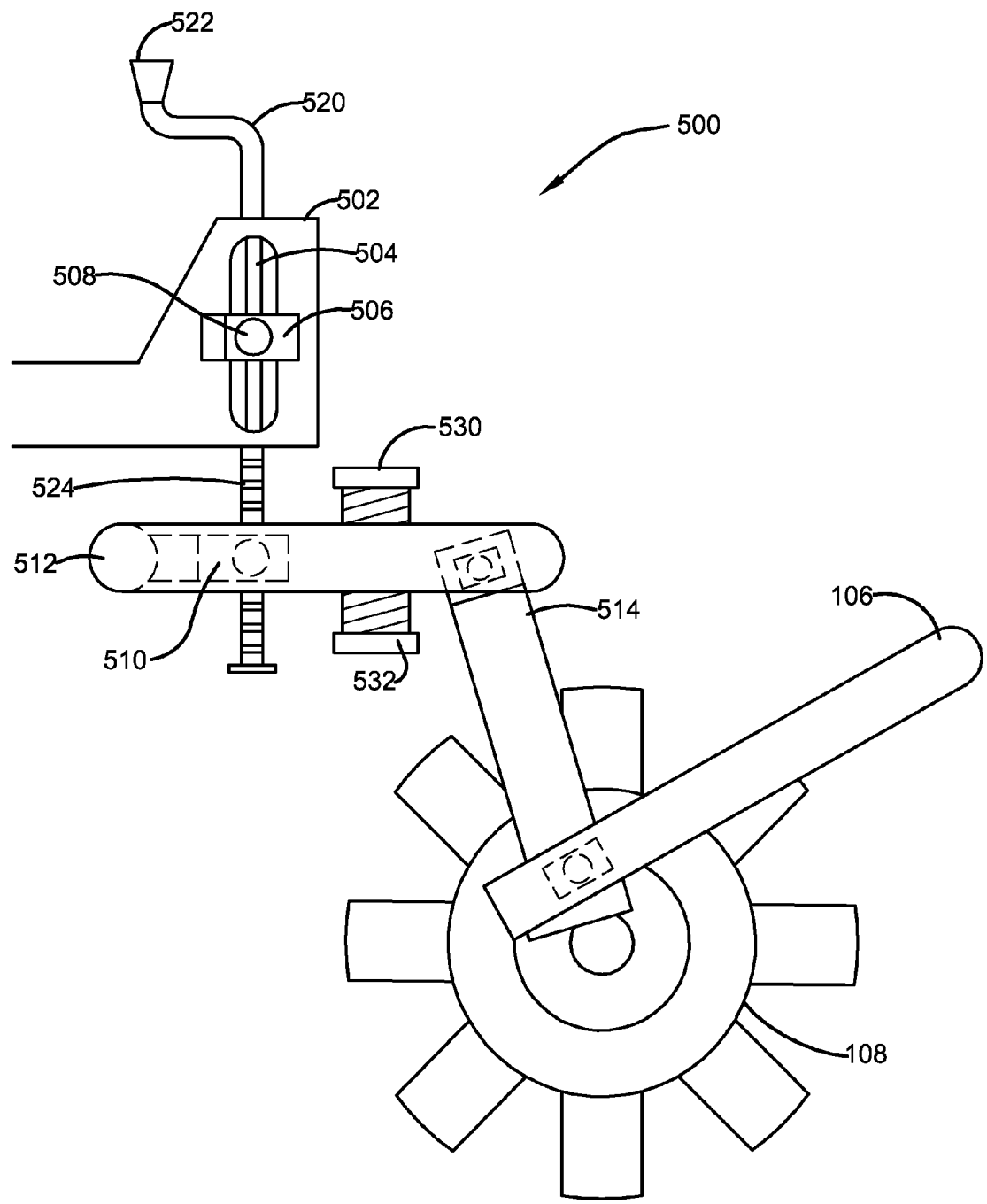
FIG. 5 shows a side view of an example embodiment of a centrally located adjustable linkage.
Figure 6:
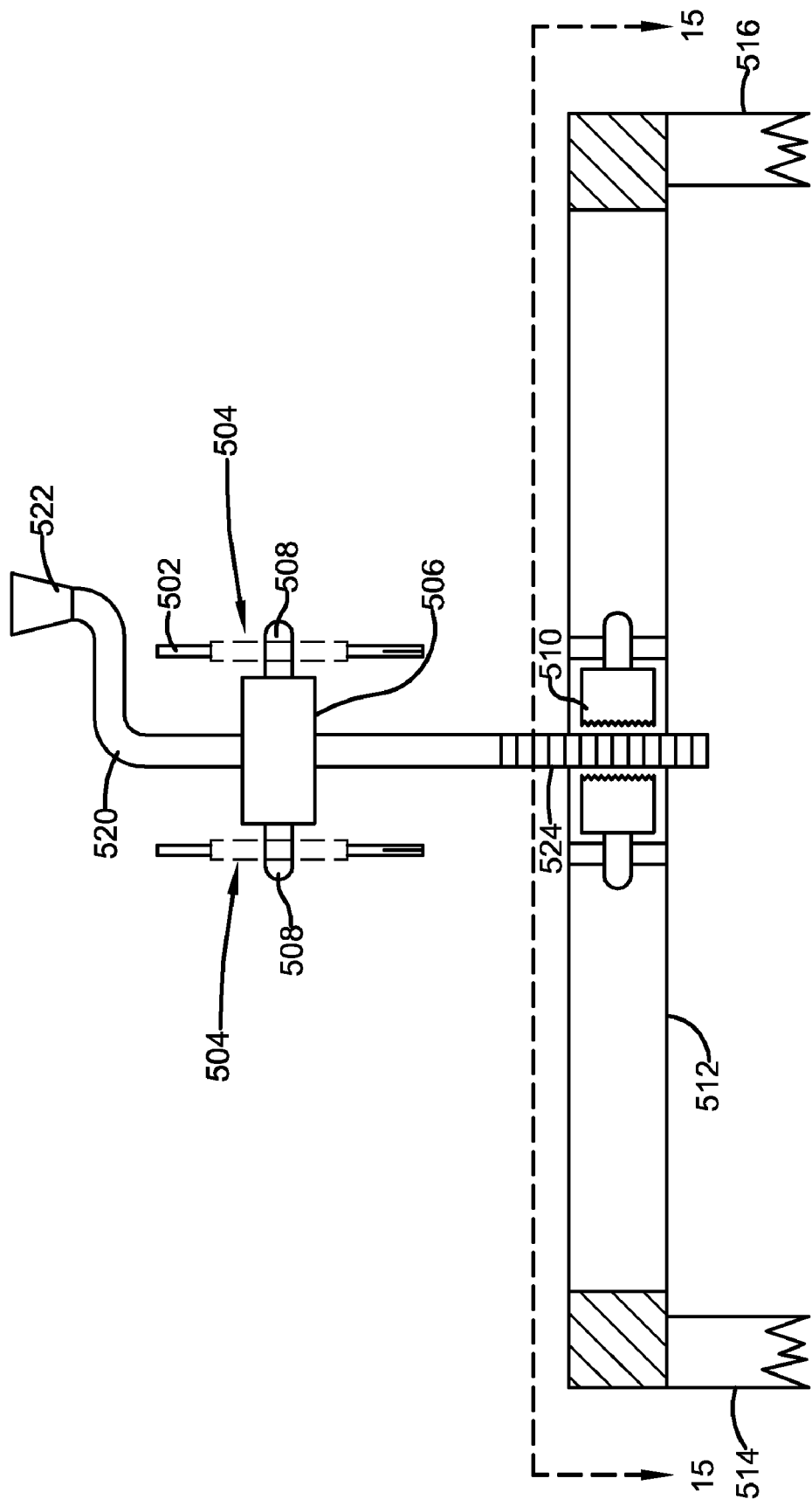
FIG. 6 shows a front partial cross-sectional view of the linkage.
Figure 15:
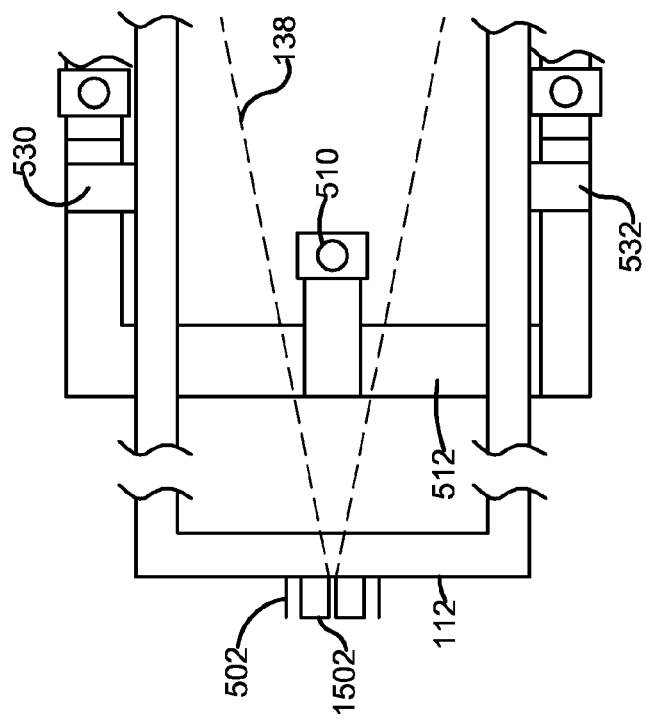
FIG. 15 shows a top cross-sectional view of an example embodiment of the adjustable linkage.
Figure 14:
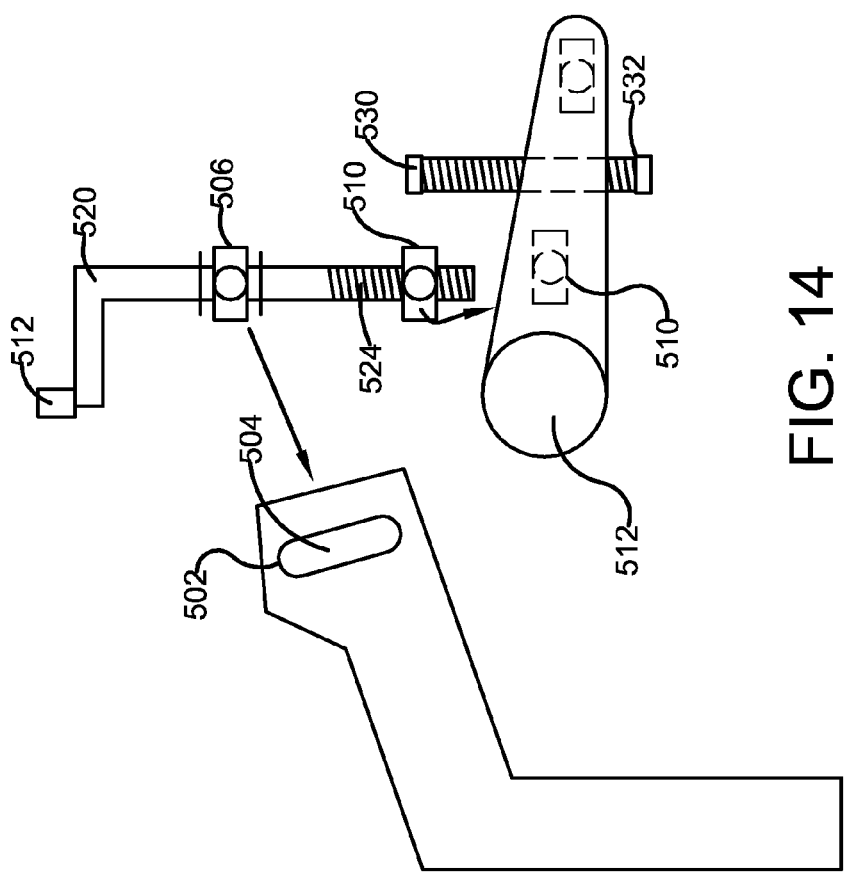
FIG. 14 shows an exploded view of an example embodiment of the adjustable linkage.

In addition as shown in FIGS. 5, 14, and 15, example embodiments may include upper and lower stops 530, 532 to limit the maximum relative vertical movement of the linkage. FIG. 15 also illustrates an example of a guide fin and stabilizer bar guide groove space 1502 and implement 3-point anchor truss paths 138.

In the previously described embodiments, each of the dicing drum, the drive roller, and the carrier wheels include respective rotational axes 256, 258, 260 (shown in FIG. 2). The rotational axes of the dicing drum, the drive roller and the carrier wheels are spaced apart in a sequence from front to back in the order of a dicing drum rotational axis followed by a drive roller rotational axis, followed by the rotational axes of the carrier wheel.

Referring back to FIGS. 1 and 2, an example embodiment of the dicing plow booster device 102 may include a riser frame bracket 146 that is operative to provide forces which assist in raising the carrier wheels. Such a riser frame bracket 146 may be in operative connection with the first framework (such as with the drive roller frame 112) and the second framework 114. In addition, the riser frame bracket 146 may include at least one spring 148 which is operatively configured to urge the second framework to pivot upwardly relative to the first framework.

In addition, referring to FIG. 2, an example embodiment of the dicing plow booster device 102 may include a drum catch 262 in operative connection with the first framework between the drive roller and the dicing drum. Such a drum catch may be operative to direct at least a portion of debris exiting the dicing drum towards the drive roller.

As discussed previously, the dicing drum includes a plurality of blades 110. Each blade includes a generally flat surface that extends outwardly in a radial direction with respect to a rotational axis of the dicing drum. Such blades may have lengths of from about 4 to 6 inches. However, in alternative embodiments other lengths may be used depending on soil types on which the implement is to be used.

Figure 7:
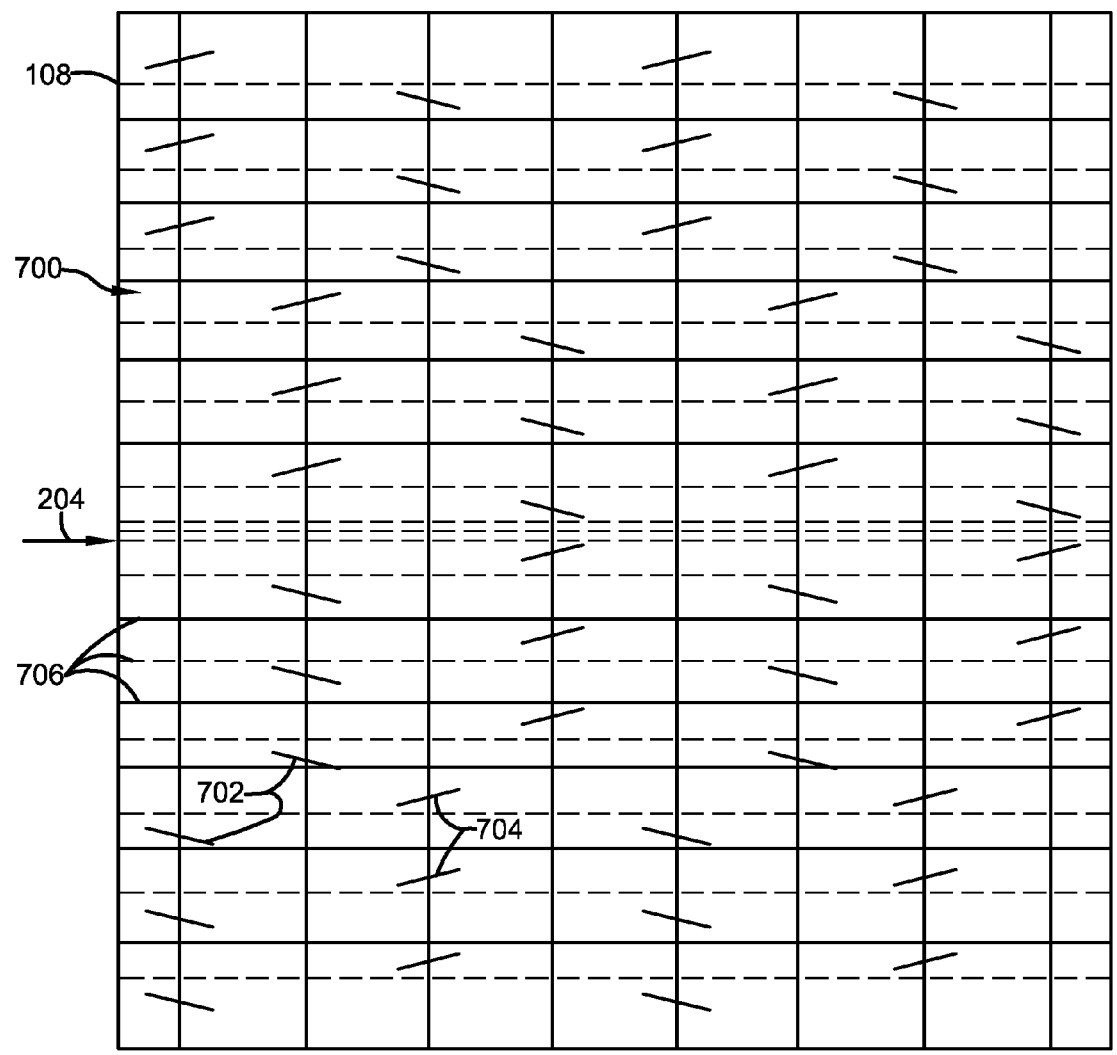
FIG. 7 shows a rolled out view of an example embodiment of a surface of a dicing drum.

In an example embodiment, such blades may include two differently oriented sets of blades. To illustrate the orientation of these two sets of blades, FIG. 7 shows an example surface 700 of the drum as if it had been cut and unrolled into a flat sheet (with all the blades extending upwardly). As shown in FIG. 7, each blade is oriented at transverse angles with respect to the first direction 204 of rotation of the dicing drum. The angle orientation may be about 15 degrees, for example. However, in other embodiments other angles may be used.

Also in this example, the transverse angles (e.g., 15 degrees) of a first set 702 of blades may be opposite the transverse angles (e.g., −15 degrees) of a second set 704 of blades. Thus, the first set of blades is operative to rake soil in one direction and the second set of blades is operative to rake soil is a second opposite direction. In example embodiments, the leading edges of the blades may also be chamfered.

To remove soil that may tend to cling to the surface 700, the dicing drum frame 106 may include a plurality of stripper fingers 264 (shown in FIG. 2) which are urged to slide along the surface 700 of the dicing drum. In FIG. 7, the horizontal broken lines 706 illustrate paths on the surface 700 of the dicing drum for example paths of the stripper fingers.

Figure 8:
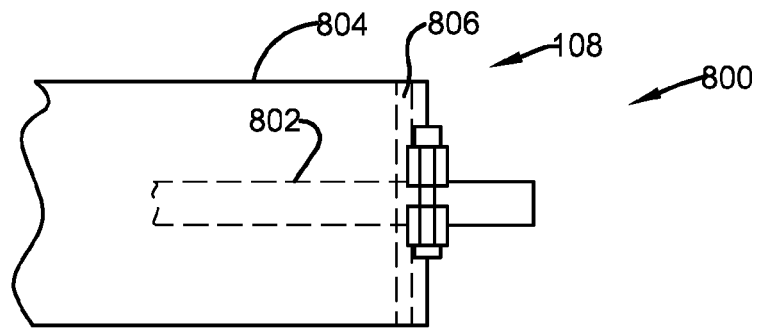
FIG. 8 shows a cross-sectional view of an example embodiment of a dicing drum.
Figure 9:
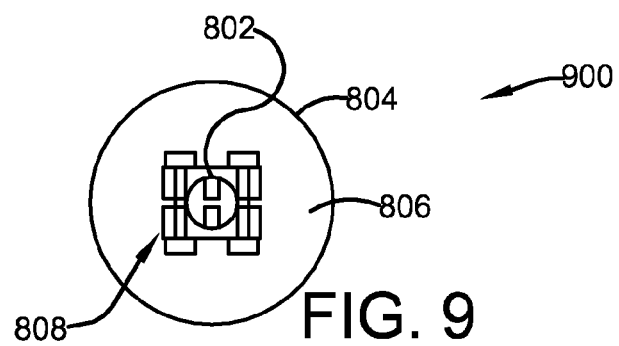
FIG. 9 shows a side view of an example embodiment of a dicing drum.

FIG. 8 illustrates an example cross-sectional view 800 of the dicing drum 108. In example embodiments, the dicing drum may include a central shaft 802 that extends through a pipe 804. Drive disc plates 806 may be welded in the ends of the pipe in locations that are inwardly recessed from the outer edges of the pipe. As shown in a side view 900 of the dicing drum in FIG. 9, the disc plates 806 may be mounted to the shaft 802 via a split hub mounting arrangement that includes threaded bolts and nuts and/or other fasteners.

Figure 10:
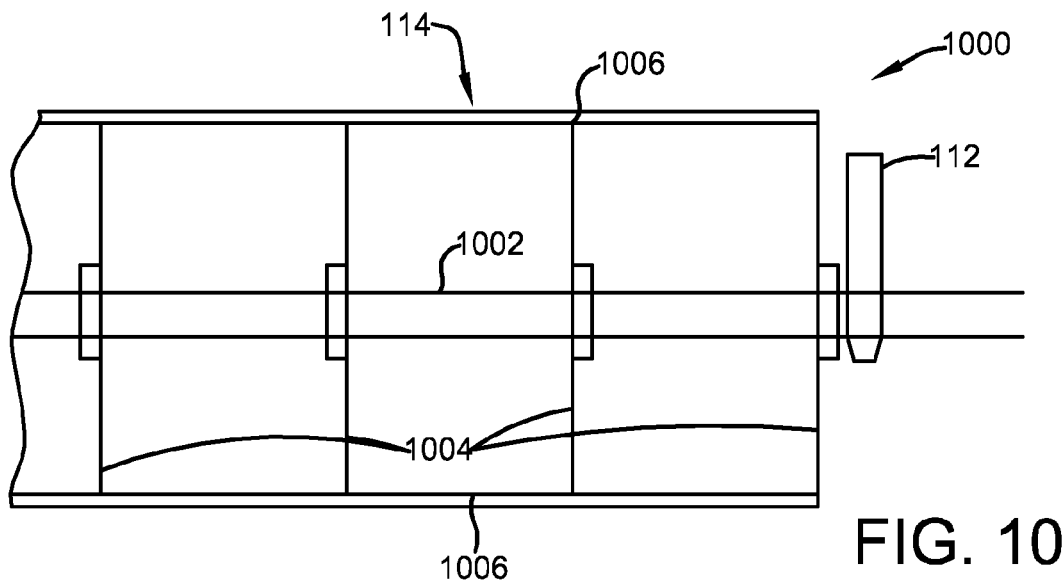
FIG. 10 shows a cross-sectional view of an example embodiment of a drive roller.

FIG. 10 illustrates an example cross-sectional view 1000 of the drive roller 114. In example embodiments, the drive roller may include a central shaft 1002. The drive roller may include several spiders 1004 that extend in radial directions from the central shaft. Such spiders may be keyed to the shaft. The number of spiders may depend on the desired length of the drive roller and the size of the plow. For example, with a four bottom plow, an example roller may include five spiders keyed to the shaft. To provide traction, angle irons 1006 may be bolted (or otherwise fastened) around the circumference of the spiders 1004. In an example embodiment, the drive roller frame 112 may be comprised of framing tubes or other framing structures that are operative to support the drive roller.

Figure 13:
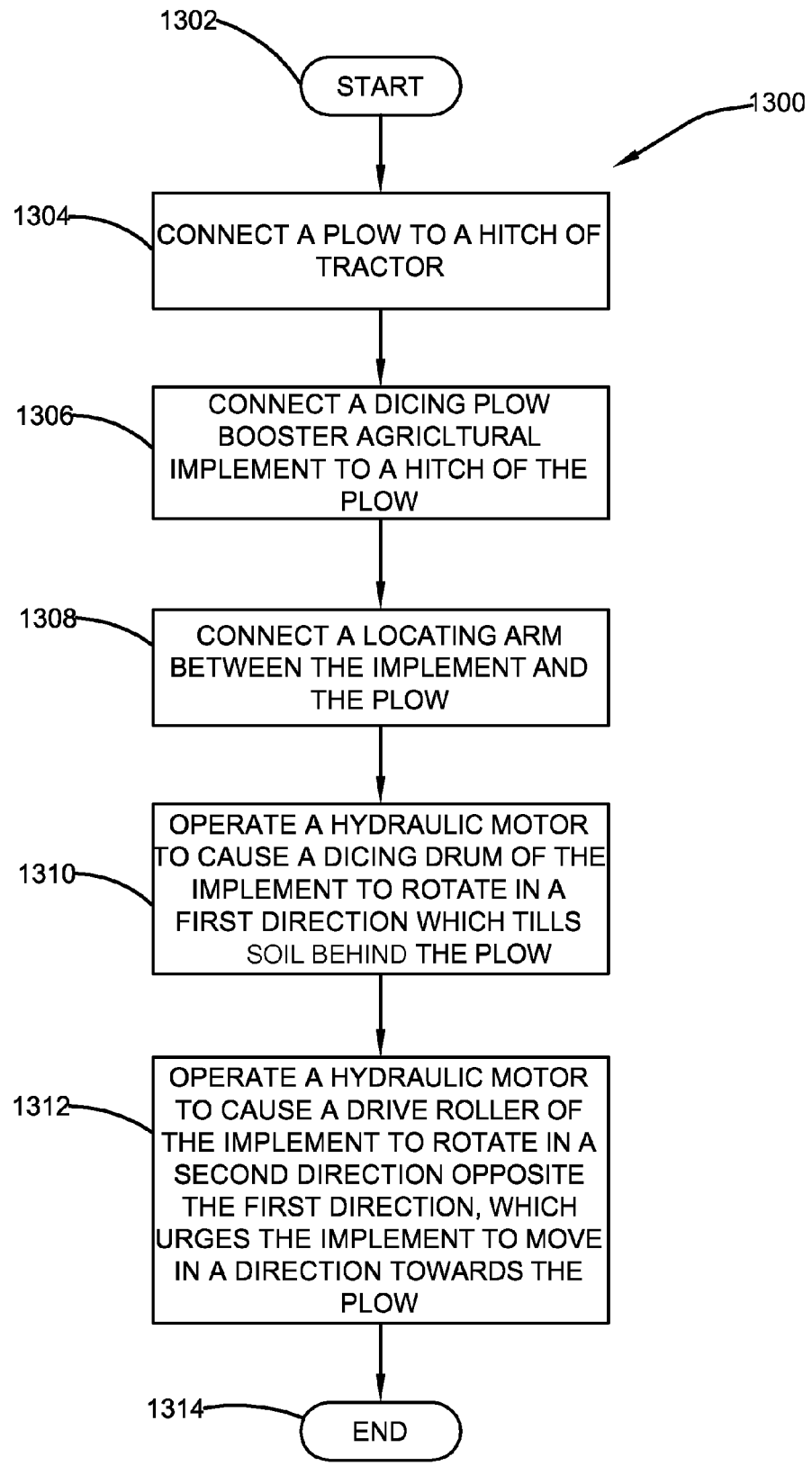
FIG. 13 is flow diagram that illustrates an example methodology for using the example agricultural apparatus.

With reference now to FIG. 13, an example methodology is illustrated and described which facilitates using an example embodiment of the dicing plow booster device 102. While the methodology is described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

As shown in FIG. 13, a methodology 1300 begins at 1302, and at 1304 includes a step of connecting a hitch device of a plow to a corresponding hitch device of a tractor. In addition at 1306, the methodology includes a step of connecting a hitch device of the dicing plow booster device to a corresponding further hitch device at the front end of the plow. Further, at 1308 the methodology may include connecting a locating control arm in operative connection with the dicing plow booster device to a back end of the plow In addition at step 1310, the methodology may include a step of operating at least one first hydraulic motor to cause the dicing drum to rotate in a first direction which tills soil behind the plow. In addition, the methodology may include a step 1312 of operating at least one second hydraulic motor to cause the drive roller to rotate in a second direction opposite the first direction. As discussed previously, the drive roller rotating in the second direction is operative to urge the dicing plow booster device to move in a direction towards the plow. At step 1314 the methodology may end.

In addition, it should be appreciated that that this described methodology may include other steps associated with the operation of different elements of the apparatus described herein. For example, the methodology may include a step of raising the carrier wheels (which lowers the dicing drum and drive roller onto the ground). Also the methodology may include a step of lowering the carrier wheels (which raises the dicing drum and drive roller off of the ground). Further, the methodology may include mounting additional agricultural implements behind the described dicing plow booster device.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. An apparatus comprising:
   an agricultural implement comprising:
   a first framework comprising:
   a dicing drum frame;
   a dicing drum in rotating connection with the dicing drum frame, wherein the dicing drum comprises a plurality of blades;
   at least one first hydraulic motor operatively configured to cause the dicing drum to rotate in a first direction;
   a drive roller frame;
   a drive roller in rotating connection with the drive roller frame;
   at least one second hydraulic motor operatively configured to cause the drive roller to rotate in a second direction opposite the first direction;
   a second framework in pivoting connection with the first framework, wherein the second framework includes:
   at least one carrier wheel;
   at least one hydraulic cylinder, wherein the at least one hydraulic cylinder includes first and second opposed ends, wherein the first and second ends are in operative connection respectively with the first framework and the second framework, wherein the hydraulic cylinder is operative to move between an extended position and a retracted position, wherein when the hydraulic cylinder is in the extended position, the second framework is in a position relative to the first framework in which a lowermost surface of the at least one carrier wheel is located above a lowermost surface of at least one of the drive roller and the dicing drum, wherein when the hydraulic cylinder is in the retracted position, the first framework is in a position relative to the second framework in which lowermost surfaces of both the drive roller and the dicing drum are located above the lowermost surface of the at least one carrier wheel; and
   a locating control arm in operative connection with at least one of the first and second frameworks, wherein the locating control arm is adapted to connect to and extend rearward from a back end of a plow, wherein the agricultural implement includes a front end and a back end and a hitch device adjacent the front end that is operative to connect to a corresponding hitch device that is mounted to a front end of the plow.

2. The apparatus according to claim 1, further comprising the plow, wherein the front end of the plow further includes a hitch device that is operative to connect to a corresponding hitch device of a back end of a tractor, wherein when the agricultural implement is mounted to the plow, the dicing drum, drive roller, and the at least one carrier wheel are positioned rearwardly of the plow, wherein the drive roller rotating in the second direction is operative to urge the agricultural implement to move in a direction towards the plow.

3. The apparatus according to claim 1, wherein the back end of the agricultural implement includes a three-point quick-coupler that facilitates mounting at least one further implement rearwardly of the agricultural implement.

4. The apparatus according to claim 1, further comprising a hydraulic pump, a hydraulic fluid reservoir, and a hydraulic line in fluid communication between the hydraulic pump and the hydraulic fluid reservoir, wherein the hydraulic line includes first and second line portions that extend in parallel between the hydraulic pump and the hydraulic fluid reservoir, wherein the first line portion is in operative connection with the at least one first hydraulic motor, wherein the second line portion is in operative connection with the at least one second hydraulic motor.

5. An apparatus comprising:
an agricultural implement comprising:
a first framework comprising:
a dicing drum frame;
a dicing drum in rotating connection with the dicing drum frame, wherein the dicing drum comprises a plurality of blades;
at least one first hydraulic motor operatively configured to cause the dicing drum to rotate in a first direction;
a drive roller frame;
a drive roller in rotating connection with the drive roller frame;
at least one second hydraulic motor operatively configured to cause the drive roller to rotate in a second direction opposite the first direction;
a second framework in pivoting connection with the first framework, wherein the second framework includes:
at least one carrier wheel;
at least one hydraulic cylinder, wherein the at least one hydraulic cylinder includes first and second opposed ends, wherein the first and second ends are in operative connection respectively with the first framework and the second framework, wherein the hydraulic cylinder is operative to move between an extended position and a retracted position, wherein when the hydraulic cylinder is in the extended position, the second framework is in a position relative to the first framework in which a lowermost surface of the at least one carrier wheel is located above a lowermost surface of at least one of the drive roller and the dicing drum, wherein when the hydraulic cylinder is in the retracted position, the first framework is in a position relative to the second framework in which lowermost surfaces of both the drive roller and the dicing drum are located above the lowermost surface of the at least one carrier wheel; and
a hydraulic pump, a hydraulic fluid reservoir, and a hydraulic line in fluid communication between the hydraulic pump and the hydraulic fluid reservoir, wherein the hydraulic line includes first and second line portions that extend in parallel between the hydraulic pump and the hydraulic fluid reservoir, wherein the first line portion is in operative connection with the at least one first hydraulic motor, wherein the second line portion is in operative connection with the at least one second hydraulic motor, wherein the drive roller includes at least one drive roller sprocket connected via at least one chain to at least one motor sprocket of the at least one second hydraulic motor, wherein the at least one first hydraulic motor is operative to cause the at least one dicing drum to rotate the dicing drum at higher RPMs than the at least one second hydraulic motor is operative to cause the at least one drive roller sprocket to rotate the drive roller.

6. The apparatus according to claim 5, wherein a gearing ratio between the at least one second motor sprocket and the at least one drive roller sprocket is in a range of about 1-8 to about 1-10.

7. The apparatus according to claim 6, wherein the dicing drum frame is in pivoting connection with the drive roller frame, further comprising at least one linkage between the dicing drum frame and the drive roller frame, wherein the first end of the at least one hydraulic cylinder is in operative connection with at least one of the dicing drum frame and the drive roller frame, wherein when the at least one hydraulic cylinder moves between the extended and retracted positions, the at least one linkage is operative to cause both the dicing drum frame and the drive roller frame to move together relative the second framework.

8. The apparatus according to claim 7, wherein the at least one linkage is in slideable connection with at least one of the drive roller frame and the dicing drum frame.

9. The apparatus according to claim 8, wherein the drive roller frame includes a slotted frame bracket including spaced-apart slots therein, wherein the linkage includes a trunnion having projections that are operative to slide in the spaced-apart slots, wherein the linkage includes a second trunnion that is in operative connection with the dicing drum frame, wherein the linkage includes a threaded shaft, wherein the threaded shaft is operative to rotate with respect to the first and second trunnions, wherein rotation of the threaded shaft is operative to change a distance between the first and second portions of the trunnion, wherein when the dicing drum frame moves upwardly in response to the at least one hydraulic cylinder moving from the extended position to the retracted position, the first trunnion is operative to move relative to the spaced-apart slots until the projections of the first trunnion reach an end of the spaced-apart slots, wherein further upward movement of the dicing drum frame is operative to cause the first trunnion to urge the drive roller frame upwardly.

10. The apparatus according to claim 9, wherein each of the dicing drum, the drive roller, and the at least one carrier wheel include respective rotational axes, wherein the rotational axes of the dicing drum, the drive roller and the at least one carrier wheel are spaced apart in a sequence from front to back in the order of a dicing drum rotational axis followed by a drive roller rotational axis, followed by at least one carrier wheel rotational axis.

11. An apparatus comprising:
an agricultural implement comprising:
a first framework comprising:
a dicing drum frame;
a dicing drum in rotating connection with the dicing drum frame, wherein the dicing drum comprises a plurality of blades;
at least one first hydraulic motor operatively configured to cause the dicing drum to rotate in a first direction;
a drive roller frame;
a drive roller in rotating connection with the drive roller frame;
at least one second hydraulic motor operatively configured to cause the drive roller to rotate in a second direction opposite the first direction;
a second framework in pivoting connection with the first framework, wherein the second framework includes:
at least one carrier wheel;
at least one hydraulic cylinder, wherein the at least one hydraulic cylinder includes first and second opposed ends, wherein the first and second ends are in operative connection respectively with the first framework and the second framework, wherein the hydraulic cylinder is operative to move between an extended position and a retracted position, wherein when the hydraulic cylinder is in the extended position, the second framework is in a position relative to the first framework in which a lowermost surface of the at least one carrier wheel is located above a lowermost surface of at least one of the drive roller and the dicing drum, wherein when the hydraulic cylinder is in the retracted position, the first framework is in a position relative to the second framework in which lowermost surfaces of both the drive roller and the dicing drum are located above the lowermost surface of the at least one carrier wheel; and a riser frame bracket in operative connection with the first framework and the second framework, wherein the riser frame bracket includes at least one spring which is operatively configured to urge the second framework to pivot upwardly relative to the first framework.

12. The apparatus according to claim 11, further comprising a drum catch in operative connection with the first framework between the drive roller and the dicing drum, where the drum catch is operative to direct at least a portion of debris exiting the dicing drum towards the drive roller.

13. The apparatus according to claim 11, wherein the dicing drum includes two differently oriented sets of blades, wherein each blade includes a generally flat surface that extends outwardly in a radial direction with respect to a rotational axis of the dicing drum, wherein the generally flat surface of each blade is oriented at transverse angles with respect to the first direction of rotation of the dicing drum, wherein the transverse angles of the first set of blades is opposite the transverse angles of the second set of blades.

14. The apparatus according to claim 11, further comprising a locating control arm in operative connection with at least one of the first and second frameworks, wherein the locating control arm is adapted to connect to and extend rearward from a back end of a plow, wherein the agricultural implement includes a front end and a back end and a hitch device adjacent the front end that is operative to connect to a corresponding hitch device that is mounted to a front end of the plow.

15. An apparatus comprising:
a plow, wherein the plow includes a front end and a back end, wherein a front end of the plow includes a hitch device that is operative to connect to a corresponding hitch device of a back end of a tractor, wherein the front end of the plow includes a further hitch device; and
an agricultural implement comprising:
  a first framework comprising:
    a dicing drum frame;
    a dicing drum in rotating connection with the dicing drum frame, wherein the dicing drum comprises a plurality of blades;
    at least one first hydraulic motor operatively configured to cause the dicing drum to rotate in a first direction;
    a drive roller frame;
    a drive roller in rotating connection with the drive roller frame;
    at least one second hydraulic motor operatively configured to cause the drive roller to rotate in a second direction opposite the first direction; and
  a locating control arm in pivoting connection with the first framework and in operative connection with the back end of the plow such that the locating control arm extends rearward from the back end of the plow, wherein the agricultural implement includes a front end and a back end and a hitch device adjacent the front end that is in operative connection with the further hitch device at the front end of the plow, wherein the dicing drum and drive roller are positioned rearwardly of the plow, wherein the drive roller rotating in the second direction is operative to urge the agricultural implement to move in a direction towards the plow.

16. The apparatus according to claim 15, wherein the agricultural implement further comprises:
a second framework in pivoting connection with the first framework, wherein the second framework includes:
  at least one carrier wheel;
  at least one hydraulic cylinder, wherein the at least one hydraulic cylinder includes first and second opposed ends, wherein the first and second ends are in operative connection respectively with the first framework and the second framework, wherein the hydraulic cylinder is operative to move between an extended position and a retracted position, wherein when the hydraulic cylinder is in the extended position, the second framework is in a position relative to the first framework in which the a lowermost surface of the at least one carrier wheel is located above a lowermost surface of at least one of the drive roller and the dicing drum, wherein when the hydraulic cylinder is in the retracted position, the first framework is in a position relative to the second framework in which the lowermost surfaces of both the drive roller and the dicing drum are located above the lowermost surface of the at least one carrier wheel.

17. A method comprising:
a) connecting a plow to a tractor, wherein the tractor includes a back end, wherein the back end of the tractor includes a hitch device, wherein the plow includes a front end and a back end, wherein the front end of the plow includes a hitch device, wherein connecting the plow to the tractor includes placing the hitch device at the front end of the plow in operative connection with the hitch device at the back end of the tractor, wherein the front end of the plow includes a further hitch device;
b) connecting an agricultural implement to the plow, wherein the agricultural implement includes a front end, wherein the front end of the agricultural implement includes a hitch device, wherein the agricultural implement includes a dicing drum, a drive roller, at least one first hydraulic motor, and at least one second hydraulic motor, wherein the dicing drum and drive roller are positioned rearward of the plow, wherein the dicing drum comprises a plurality of blades, wherein connecting the agricultural implement to the plow includes:
  placing the hitch device at the front end of the agricultural implement in operative connection with the further hitch device at the front end of the plow; and
  connecting a locating control arm in operative connection between the agricultural implement and the back end of the plow;
c) operating the at least one first hydraulic motor to cause the dicing drum to rotate in a first direction which tills soil behind the plow;
d) operating the at least one second hydraulic motor to cause the drive roller to rotate in a second direction opposite the first direction, wherein the drive roller rotating in the second direction is operative to urge the agricultural implement to move in a direction towards the plow.

* * * * *